US 6,735,245 B1
United States Patent
Palm

(10) Patent No.: US 6,735,245 B1
(45) Date of Patent: May 11, 2004

(54) ACTIVATION OF MULTIPLE XDSL MODEMS WITH CHANNEL PROBE

(75) Inventor: Stephen Palm, Tokyo (JP)

(73) Assignee: Panasonic Communications Co., Ltd., Fukuoka (JP)

(*) Notice: Subject to any disclaimer, the term of this patent is extended or adjusted under 35 U.S.C. 154(b) by 0 days.

(21) Appl. No.: 09/217,556

(22) Filed: Dec. 21, 1998

(30) Foreign Application Priority Data

Jan. 9, 1998 (JP) .......................................... 10-015057

(51) Int. Cl.⁷ ................................................. H04L 5/16
(52) U.S. Cl. ....................................... 375/222; 375/260
(58) Field of Search ................................. 375/219, 222, 375/260, 377; 379/93.01; 709/227

(56) References Cited

U.S. PATENT DOCUMENTS

| | | | |
|---|---|---|---|
| 4,368,361 A | * 1/1983 | Chung et al. .................. | 379/3 |
| 4,680,773 A | 7/1987 | Amundson | |
| 4,897,831 A | 1/1990 | Negi et al. | |
| 5,163,131 A | 11/1992 | Row et al. | |
| 5,280,586 A | 1/1994 | Kunz et al. | |
| 5,311,578 A | 5/1994 | Bremer et al. | |
| 5,321,722 A | 6/1994 | Ogawa | |
| 5,349,635 A | 9/1994 | Scott | |
| 5,371,534 A | * 12/1994 | Dagdeviren et al. ..... | 348/14.01 |
| 5,377,188 A | 12/1994 | Seki | |
| 5,400,322 A | 3/1995 | Hunt et al. | |
| 5,410,343 A | 4/1995 | Coddington et al. | |
| 5,448,566 A | 9/1995 | Richter et al. | |
| 5,463,382 A | 10/1995 | Nikas et al. | |
| 5,463,661 A | 10/1995 | Moran et al. | |
| 5,479,447 A | 12/1995 | Chow et al. | |
| 5,608,764 A | 3/1997 | Sugita et al. | |
| 5,644,573 A | 7/1997 | Bingham et al. | |
| 5,668,857 A | 9/1997 | McHale | |
| 5,682,419 A | 10/1997 | Grube et al. | |
| 5,715,277 A | 2/1998 | Goodson et al. | |
| 5,751,914 A | 5/1998 | Coley et al. | |
| 5,757,803 A | 5/1998 | Russell et al. | |
| 5,781,617 A | 7/1998 | McHale et al. | |
| 5,796,808 A | * 8/1998 | Scott et al. .............. | 379/93.01 |
| 5,805,669 A | 9/1998 | Bingel et al. | |
| 5,852,655 A | 12/1998 | McHale et al. | |
| 5,898,761 A | * 4/1999 | McHale et al. .......... | 379/93.01 |
| 5,903,608 A | 5/1999 | Chun | |
| 5,910,970 A | * 6/1999 | Lu ............................. | 375/377 |
| 5,912,921 A | 6/1999 | Warren et al. | |
| 5,987,061 A | * 11/1999 | Chen .......................... | 375/222 |
| 5,999,563 A | * 12/1999 | Polley et al. ............... | 375/222 |

(List continued on next page.)

FOREIGN PATENT DOCUMENTS

| | | |
|---|---|---|
| CA | 2111543 | 6/1994 |
| CA | 2027230 | 4/1995 |
| EP | 0820168 | 1/1998 |
| JP | 6-97980 | 4/1994 |
| JP | 10-75279 | 3/1998 |
| WO | 97/49229 | 2/1997 |
| WO | 99/35756 | 7/1999 |

OTHER PUBLICATIONS

English Language Abstract of JP 6–97980.
An article published in the periodical, "Nikkei Communications," vol. 252, Aug. 18, 1997, pp. 80–89, with English Translation.

*Primary Examiner*—Stephen Chin
*Assistant Examiner*—Kevin Kim
(74) *Attorney, Agent, or Firm*—Greenblum & Bernstein, P.L.C.

(57) ABSTRACT

Method and apparatus for enabling data communication. The quality of a communication channel is determined using line probing techniques. In addition, capabilities of the communication devices are exchanged between a central location and a remote location. Based upon the quality of the communication channel, and the capabilities of the communication channel, an appropriate communication standard is selected.

16 Claims, 12 Drawing Sheets

U.S. PATENT DOCUMENTS

| | | |
|---|---|---|
| 6,002,722 A | 12/1999 | Wu |
| 6,021,120 A * | 2/2000 | Beyda et al. ............... 370/282 |
| 6,055,268 A | 4/2000 | Timm et al. |
| 6,064,693 A | 5/2000 | Oliver et al. |
| 6,073,179 A * | 6/2000 | Liu et al. .................... 370/238 |
| 6,092,122 A * | 7/2000 | Lie et al. ..................... 709/277 |
| 6,192,109 B1 * | 2/2001 | Amrany et al. ............... 379/30 |
| 6,252,900 B1 * | 6/2001 | Liu et al. .................... 375/219 |
| 2001/0043568 A1 * | 11/2001 | McHale et al. ............. 370/254 |

* cited by examiner

ACTIVATION OF MULTIPLE XDSL MODEMS WITH CHANNEL PROBE

BACKGROUND OF THE INVENTION

1. Field Of The Invention

The present invention is directed to a communications device, such as, for example, a modem and a method for enabling data communication, and in particular, to an apparatus and method that detects various communication configurations and selects an appropriate communication configuration to establish a communication link.

2. Discussion Of Background And Other Information

Traditionally, data communication devices, such as, for example, modems (both analog and digital), have been employed over public switched telephone networks (PSTN) to transmit data between a first location and a second location. Such modems operate within a conventional voice band (e.g., approximately 0 through 4 kHz bandwidth) of the PSTN. Early modems transmitted data over the PSTN at a speed of approximately 300 bits per second (bps), or less. Over time, and with the increased popularity of the Internet, faster communication schemes (e.g., modems) were demanded and developed. Currently, the fastest analog modem available (referred to as an ITU-T V.34 modem, as defined by the International Telecommunication Union (ITU)), transmits data at a rate of approximately 33,600 bps under ideal conditions. These modems continue to exchange data within the approximate 4 kHz bandwidth of the PSTN.

It is not uncommon to transfer data files that are several megabytes (MB) in size. A modem that operates utilizing the V.34 modulation requires a long time to transfer such a file. As a result, a need has developed for even faster modems.

Accordingly, many new communication methods are being proposed and/or developed to transmit data on the local twisted wire pair that uses the spectrum above the traditional 4 kHz band. For example, various "flavors" (variations) of digital subscriber line (DSL) modems have been/are being developed, such as, but not limited to, for example, DSL, ADSL, VDSL, HDSL and SDSL (the collection of which is generally referred to as xDSL). Several of the various xDSL schemes permit simultaneous communication on a single twisted pair in the voice band and the band above the voice band. Each xDSL variation employs a different communication scheme, resulting in different upstream and/or downstream transfer speeds, and utilize differing frequency bands of the twisted pair communication channel. In addition, some xDSL variations require filters including low pass filters, high pass filters and combinations of filters that are sometimes referred to as "splitters", which may differ between the installations. The filters separate the frequency band that carries voice band communication from the frequency band above the voice band carrying data communication. The line environments surrounding the xDSL data communication schemes, such as, for example, their ability to co-exist with a conventional analog modem that communicates within the conventional voice band (e.g., 0–4 kHz bandwidth), differences in central office equipment, quality of the line, etc., are numerous, differ significantly, and are complicated. Accordingly, it is essential to be able to determine the capabilities of the communication channel in addition to being able to determine the capabilities of the communication equipment in order to establish an optimum and non-interfering communication link.

Conventional start-up sequences (such as, for example, V.8 and/or V.8bis protocols, as established by the ITU-T), as implemented by, for example, V.34 modems, use a sequence of bits transmitted from each modem to identify and negotiate the varying equipment capabilities, such as the modulation scheme employed, protocol, etc. These startup sequences are applicable only to the conventional voice band communication methods. These conventional startup sequences do not test (or disclose) the constitution and/or condition of the communication channel.

However, for xDSL modems, line condition information, such as, for example, frequency characteristics, noise characteristics, presence or absence of a splitter, etc., is useful at the time that two modems are negotiating prior to connecting to each other, if the communications link is to be successfully established.

Voice band line probing techniques are known in the art and can be used to determine voice band line condition information. Such techniques have been used effectively to optimize a given modulation method, such as, for example, V.34. In a set of devices with multiple modulation methods, V.8 or V.8bis has been used to negotiate and then select a particular modulation, and after that modulation initiation sequence has started, line probing techniques are used to receive some indication of the condition of the communication channel. If it is determined at that point that a given communication channel could not effectively support a chosen modulation method, time consuming heuristic (i.e., self-learning) fallback techniques are employed by the prior art to try and find a modulation method that works.

Accordingly, what is required to establish an improved communication link is a method to observe (or examine) the line conditions before attempting to select the most appropriate communication method. Thus, while techniques have been established to increase the data rate for a given modulation, the prior art does not provide a method for using channel information to aid in the selection of the communication method.

Unfortunately, in the current state of the art, capability negotiations occur without knowledge of the prevailing channel configuration. Explicit knowledge of spectrum, splitting, etc. is vital to the selection of the appropriate communication mechanism (modulation) decision process.

SUMMARY OF THE INVENTION

Based on the foregoing, the overall purpose of the present invention is to develop a communication method, modem device and a data communication system that detects various configurations, capabilities and limitations of a communication channel and associated equipment in order to determine a specific (xDSL) communication standard appropriate for the existing line conditions. To accomplish this goal, the invention employs several individual techniques as a system.

According to one aspect of the present invention, a method and apparatus are provided to negotiate between modems that embody a multiple (plural) communication methods (e.g., DSL standards), so as to select a single common communication standard to be used for a communication session. A communication control section executes a handshake procedure (protocol) in a negotiation channel to obtain information concerning high speed data communication, including type identification information of xDSL used in the communication exchange. A communication standard refers to any type of standard, whether defacto, proprietary, or issued by an industry or government body.

In another aspect of the instant invention, a method is provided for determining characteristics of the communication channel between a central communication system and a remote communication system by using an examination signal. The examination signal detects impairments, such as, but not limited to, frequency rolloff and noise, that are identified and disclosed between the central system and the remote systems. Information pertaining to the quality of the communication channel enables the present invention to make a more informed decision concerning the selection of the subsequent communication standard. (e.g., whether to use CDSL instead of ADSL, or use CDSL instead of VDSL.)

In another aspect, the invention provides a method and apparatus to determine the presence of equipment used to split frequency bands. In many cases, the presence of such equipment is necessary to provide communication in the frequency above the voice band. The lack of such splitting equipment may necessitate the use of different communication methods. The present invention includes a method for detecting the presence of such splitters that is non-intrusive, so as not to interfere with any communication (such as, for example, a voice communication or analog data communication) that may be concurrently using the voice band.

In another aspect of the invention, a fallback procedure to a traditional voice band communication method is provided if it is determined that a high speed band communication is not possible. A notification signal (such as, for example, a spread processed signal) is transmitted within the conventional voice band that is received by a first communication control section. The notification signal includes an identification signal that indicates the capability for performing data communication within the conventional voice band.

In addition, the notification signal also determines whether the communication equipment is capable of a high speed communication, even though the communication channel is currently not capable of high speed communication. This permits, for example, a user to purchase a high speed data communications device (e.g., modem), and install the device, at which point, the central office will automatically detect the installation of the high speed communication device (at the user's location) and initiate an on-line procedure that enables the user at the remote location to order a high speed communication channel for the modem.

According to another feature of the instant invention, the notification signal that is transmitted in the voice band (to indicate that a high speed data communication can take place above the voice band) is selected so as not to interfere (disrupt) with a conventional communication (e.g., voice communication or analog data communication) that may be taking place in the voice band at the same time that a high data speed communication session is to be initiated. The notification signal, may be, for example, a spread spectrum signal that is generated with a pseudo random number sequence. Alternatively, other spread spectrum techniques that cause the transmission energy to be evenly spread throughout the voice band may be employed.

According to another aspect of the invention, an end user-to-end user communication, such as, for example, the exchange (transmission) of a user name, password, etc., may be initiated prior to the completion of the communication channel testing (e.g., line probing) and exchange of high speed communication capability, via a user clear channel. Previously, communications systems required a lengthy training (or startup) time before any end user-to-end user data could be communicated. The present invention enables a user communication path to be simultaneously established while the testing and negotiation (of the channel and communication method) used for the high speed communication is taking place.

The combination of all of the various aspects of the invention provides a method and apparatus for effectively and efficiently performing an audit of the communication channel and installed equipment to select the most appropriate communication method. System designers, installers, and providers are also able to set various parameters that are considered by the invention during the negotiation process to effectively define the meaning of "most appropriate means of communication".

According to the present invention, the determination of a possible high speed communication, exchange and selection of the supported capabilities for a high speed data communication, and examination of the communication line characteristics can be concurrently (simultaneously) executed, thus enabling the immediate shifting to a handshake protocol corresponding to the determined data communication procedure.

The invention may be included in both sides of the communication channel for optimum negotiation. However, according to an advantage of the present invention, only one side of the communication channel may incorporate (contain) the invention. Still further, one side may only partially implement the present invention. Such configurations will be accurately reported to the communication systems, and, if appropriate, the communication systems can fallback to legacy (e.g., analog) communication methods if the communication system supports such method.

Further, the instant invention does not need to be embodied in the actual high speed communication devices themselves. The invention can be implemented in intelligent switches that terminate and/or segment the communication channel. This allows a communication system to use various communication standards implemented in separate devices (or modems) that can be correctly assigned (on a "as needed" basis) through explicit negotiation of the capabilities and desires of the central system and the remote communication system.

According to an object of the instant invention, a method for selecting a communication standard from among a plurality of communication standards, comprises auditing a condition of a communication channel, and selecting the communication standard based upon the audited condition of the communication channel and a capability of each of the plurality of communication standards. Auditing of the condition of the communication channel comprises issuing a first signal over the communication channel in the signal, receiving an estimate of the effects of the communication channel, and then selecting the communication standard in response to the received estimate. Selecting of the communication standard comprises selecting one xDSL modem standard from among a plurality of xDSL modem standards.

According to an advantage of the present invention, communication standard capability information and/or user data may be issued at substantially the same time as the condition of the communication channel is audited.

A further advantage of the present invention resides in its ability to determine whether a communication channel includes a splitter.

Another object of the current invention pertains to a communications device for exchanging data, comprising a first communication device that at least one of transmits and receives negotiation information relating to communication standards over a communication channel, and a second communication device that at least one of transmits and receives examination information (such as, for example, a plurality of signals in different frequency bands) over the communication channel to determine line characteristics of the communication channel.

According to an advantage of the invention, the negotiation information and the examination information are exchanged in a substantially concurrent time period. Alternatively, the negotiation information and the examination information are exchanged in different time periods.

According to a feature of the invention, the communication device exchanges the examination information over the communication channel in a predetermined frequency band. Further, the communication device may exchange an optional examination signal in a second frequency band.

Another object of the instant invention resides in a communications device, comprising a first communication device that exchanges negotiation information between two locations, and a second communication device that at least one of transmits and receives user data. The negotiation information relates to a communication standard, such as, for example, ADSL, CDSL, HDSL, etc. and/or characteristics of a communication channel.

According to another object of the invention, a communications device is disclosed for exchanging data, comprising a first communication device that exchanges negotiation information related to a predetermined data communication, and a second communication device that exchanges a fallback notification signal over a predetermined data communication band, in which the fallback notification signal is used to indicate an availability of the second predetermined communication band.

According to an advantage of the invention, the second predetermined data communication band comprises a voice band. A voice band communication device may be used when the first communication band is unusable.

According to an advantage of the invention, the negotiation information and the fallback notification signal may be exchanged in a substantially concurrent time period, or in different time periods.

According to another advantage of the invention, the fallback negotiation signal (which may be, for example, a spread spectrum signal) does not interfere with any communication in the voice band.

Another object of the current invention pertains to a method for exchanging data between an initiation location and a responding location. According to this method, the method determines whether a predetermined signal is detected by the responding location. Fallback procedures (e.g., voice band procedures) are initiated if the predetermined signal is not detected by the responding location. On the other hand, if the predetermined signal is detected, negotiation information is exchanged between the initiating location and the responding location to establish capabilities of the initiating location and the responding location. Channel information is received by one of the initiating location and the responding location, and an appropriate communication standard is selected utilizing at least one of the exchanged negotiation information and received channel information, to establish a communication link.

According to a feature of the invention, the method further comprises analyzing the received channel information, and using the analyzed information in conjunction with the at least one of the exchanged negotiation information and received channel information to select the appropriate communication standard.

According to another feature of the invention, user data may be exchanged between the initiating location and the responding location while the "initializing" procedure is taking place.

According to another object of the instant invention, a data communications device (such as, for example, a modem) is disclosed that includes means for determining line characteristics of a communication channel, and means for initiating a high speed data communication over the communication channel, based upon the line characteristics of the communication channel determined by the determining means. A notification signal may be exchanged over the communication channel in a voice band, in which the notification signal indicates high speed data communication capabilities of the communications device.

According to a feature of the invention, the high speed data communication channel utilizes a frequency band higher than the voice band.

According to an advantage of the invention, means for determining a communication standard of the communication device may be included, so that a high speed data communication can be initiated in accordance with the determined communication standard and the determined line characteristics.

According to another advantage of the invention, means for performing a data communication over the communication channel in a voice band may be provided when the determining means determines that the communication channel does not support a high speed data communication.

A still further advantage of the invention is the inclusion of means for determining a presence of a splitter in the communication channel, in order to optimize the performance of a communication standard.

Another object of the instant invention pertains to a method for enabling data communication by detecting a presence of a splitter in a communication channel, and then determining whether high speed communication is available. The presence of a splitter may be detected using a signal that does not adversely interfere with a voice band communication.

The present disclosure relates to subject matter contained in Japanese Patent Application No. HEI 10-15057, filed on Jan. 9, 1998, which is expressly incorporated herein by reference in its entirety.

BRIEF DESCRIPTION OF THE DRAWINGS

The foregoing and other objects, features and advantages of the invention will be apparent from the following more particular description of preferred embodiments, as illustrated in the accompanying drawings which are presented as a non-limiting example, in which reference characters refer to the same parts throughout the various views, and wherein.

DETAILED DESCRIPTION OF PREFERRED EMBODIMENTS

Figure 1:
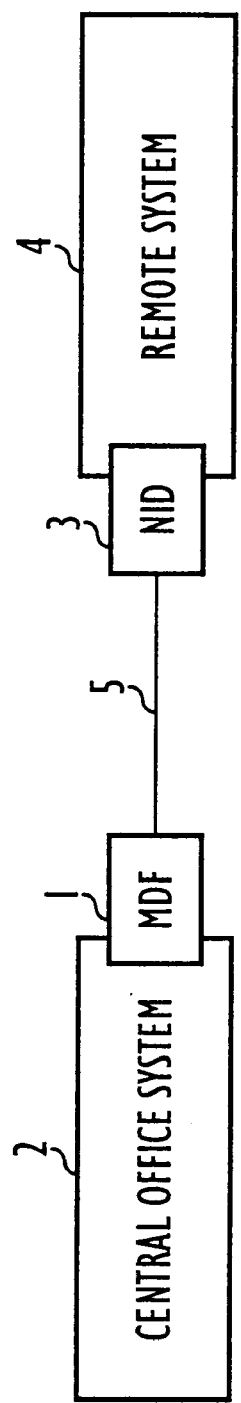
FIG. 1 illustrates a block diagram of a data communication system using a modem device according to a first embodiment of the present invention.

FIG. 1 illustrates a schematic diagram of a first embodiment of a data communication system using modem devices. It is understood that the present invention may be applied to other communications devices with out departing from the spirit and/or scope of the invention. Further, while the present invention is described with reference to a telephone communication system employing twisted pair wires, it is understood that the invention is applicable to other transmission environments, such as, but not limited to, cable communication systems (e.g., cable modems), optical communication systems, wireless systems, infrared communication systems, etc., without departing from the spirit and/or scope of the invention.

According to the first embodiment, the data communication system comprises a central office system 2 and a remote system 4 which are interfaced together via a communication channel 5.

The central office system 2 includes a main distribution frame (MDF) 1 that functions to interface the central office system 2 to the communication channel 5. The MDF 1 functions to connect, for example, telephone lines (e.g., communication channel 5) coming from the outside on one side and internal lines (e.g., internal central office lines) on the other side.

The remote system 4 includes a network interface device (NID) 3 that functions to interface the remote system 4 to the communication channel 5. The NID 3 interfaces the customer's equipment to the communications network (e.g., communication channel 5).

Figure 2:
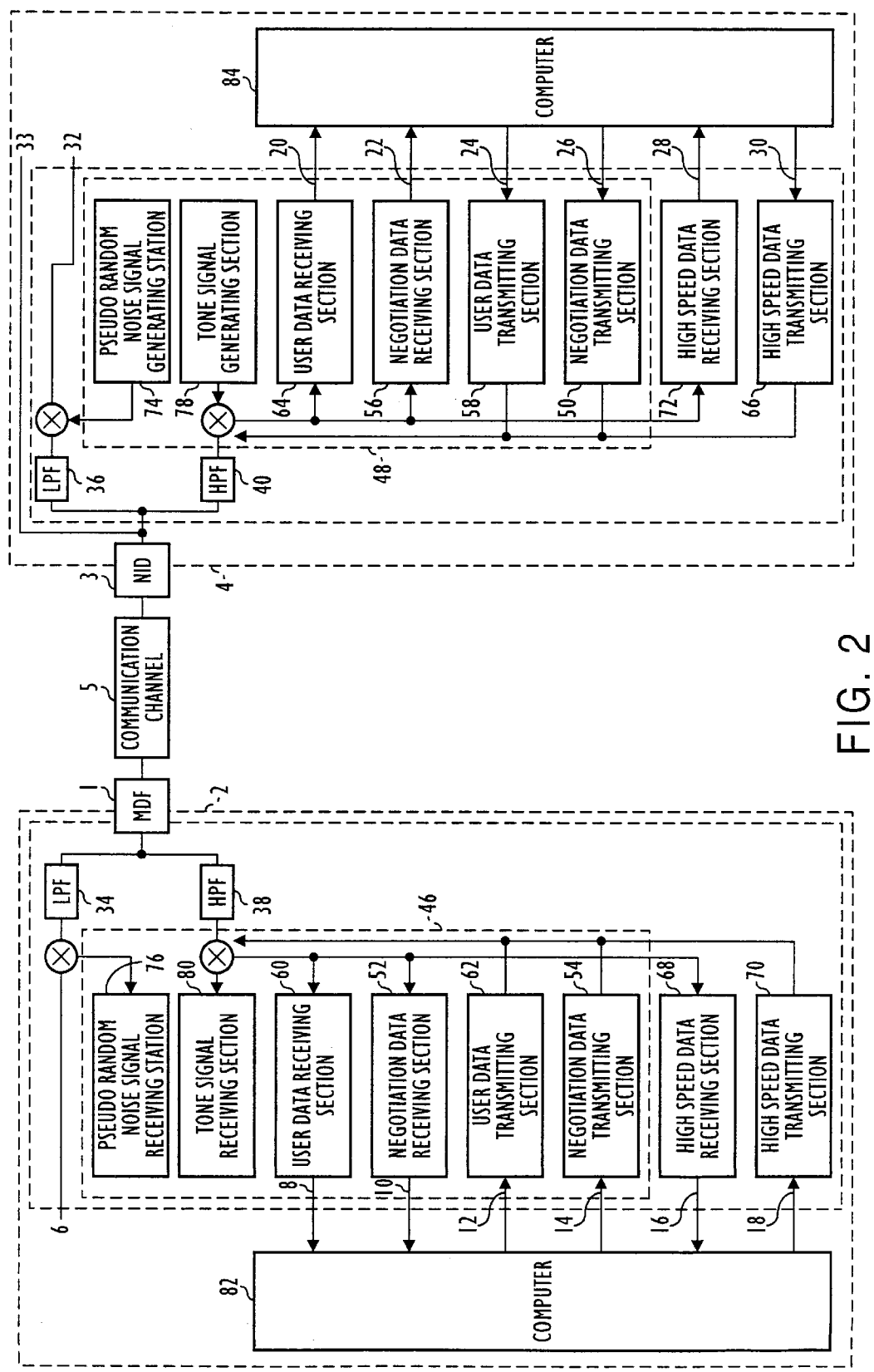
FIG. 2 illustrates a detailed block diagram of a data communication system of FIG. 1.

FIG. 2 illustrates a detailed block diagram of a first embodiment of the data communication system of FIG. 1. This embodiment represents a typical installation, in which both the central office system 1 and the remote system 4 implement the instant invention, and in which no splitter is installed at the remote system 4.

As shown in FIG. 2, the central office system 2 comprises a low pass filter 34 and a high pass filter 38, a test negotiation block 46, a high speed data receiving section 68, a high speed data transmitting section 70 and a computer 82. Computer 82 is understood to be a generic interface to network equipment that is located at the central office. Test negotiation block 46 performs all of the negotiation, line probing, etc. (to be described in detail below), which takes place prior to the actual high speed data communication.

The low pass filter 34 and high pass filter 38 function to filter communication signals transferred over the communication channel 5. The test negotiation block 46 tests and negotiates conditions, capacities, etc. of the central office system 2, the remote system 4, and the communication channel 5. The procedures of test negotiation block 46 are completed prior to, and initiate the selection of the high speed modem receiving and transmitting sections (e.g., modems) 68 and 70. The high speed receiving section 68 functions to receive high speed data transmitted from the remote system 4, while the high speed data transmitting section 70 transmits high speed data to the remote system 4. The high speed sections 68 and 70 may comprise, but not be limited to, for example, ADSL, VDSL, CDSL modems. High speed sections 68 and 70 can be a plurality of high speed transmission devices which "share" the common block 46 during the initial negotiation procedure.

In the disclosed embodiment, test negotiation block 46 comprises a pseudo random noise signal receiving section 76, a tone signal receiving section 80, a user data receiving section 60, a negotiation data receiving section 52, a user data transmitting section 62, and a negotiation data transmitting section 54.

The pseudo random noise signal receiving section 76 functions to receive a pseudo random noise signal. The tone signal receiving section 80 receives tone signals. The user data receiving section 60 receives user data, while the user data transmitting section 62 transmits user data. The negotiation data receiving section 52 receives negotiation data, while the negotiation data transmitting section transmits negotiation data. The operation of the various sections of the central office system 2 will be described, in detail, below.

It is noted that the user data receiving section 60, the negotiation data receiving section 52 and the high speed data receiving section 68 transmit signals to computer 82. The user data transmitting section 62, the negotiation data transmitting section 54 and the high speed data transmitting section 70 receive signals issued from the computer 82.

Remote system 4 comprises a low pass filter 36, a high pass filter 40, a test negotiation block 48, a high speed data receiving section 72, a high speed data transmitting section 66, and a computer 84.

The low pass filter 36 and high pass filter 40 operate to filter communication signals transferred over the communication channel 5. The test negotiation block 48 tests and negotiates conditions, capacities, etc. of the central office system 2, the remote system 4, and the communication channel 5. The high speed receiving section 72 functions to receive high speed data transmitted from the central office system 2, while the high speed data transmitting section 66 transmits high speed data to the central office system 2.

In the disclosed embodiment, the test negotiation block 48 comprises a pseudo random noise signal generating section 74, a tone signal generating section 78, a user data receiving section 64, a negotiation data receiving section 56, a user data transmitting section 58, and a negotiation data transmitting section 50.

The pseudo random noise signal generating section 74 functions to generate a pseudo random noise signal. The tone signal generating section 78 generates tone signals. The user data receiving section 64 receives user data, while the user data transmitting section 58 transmits user data. The negotiation data receiving section 56 receives negotiation data, while the negotiation data transmitting section 50 transmits negotiation data. The operation of the various sections of the remote system 4 will be described, in detail, below.

It is noted that the user data receiving section 64, the negotiation data receiving section 56 and the high speed data receiving section 72 transmit signals to the computer 84. The user data transmitting section 58, the negotiation data transmitting section 50 and the high speed data transmitting section 66 receive signals issued from the computer 84.

The central office system 2 includes a plurality of channels 6, 8, 10, 12, 14, 16 and 18 that are used to communicate with a plurality of channels 20, 22, 24, 26, 28, 30 and 32 of the remote system 4. In this regard, it is noted that in the first embodiment, channel 6 comprises a central voice channel that is used to directly communicate with a corresponding remote voice channel 32 in a conventional voice band (e.g., 0 Hz to approximately 4 kHz), which has been filtered by low pass filters 34 and 36. Further, a remote voice channel 33 is provided in the remote system 4 that is not under the control of the central office system 2. Remote voice channel 33 is connected in parallel with the communication channel 5 (but prior to the low pass filter 36), and thus, provides the same service as the remote voice channel 32. However, since this channel is prior to the low pass filter 36, the remote voice channel 33 contains both the high speed data signal and a voice signal.

It is noted that the filters may be arranged to have different frequency characteristics, so that a communication may take place using other, low band communication methods, such as, for example, ISDN, between voice channels 6 and 32. The high pass filters 38 and 40 are selected to ensure that a frequency spectrum above 4 kHz is provided.

Bit streams 8, 10, 12, 14, 16 and 18 (in the central office system 2) and bit streams 20, 22, 24, 26, 28 and 30 (in the remote system 4) comprise digital bit streams that are used to communicate between the central computer 82 and the remote computer 84, respectively. It is understood that bit streams 8, 10, 12, 14, 16, and 18 could be implemented as discrete signals (as shown), or bundled into an interface, or cable, or multiplexed into a single stream, without changing the scope and/or function of the instant invention. For example, the bit streams 8, 10, 12, 14, 16 and 18 may be configured as (but are not limited to) an interface conforming to a RS-232, parallel, FireWire (IEEE-1394), Universal Serial Bus (USB), wireless, or infrared (IrDA) standard. Likewise, it is understood that bit streams 20, 22, 24, 26, 28 and 30 can be implemented as discrete signals (as shown in the drawings), or bundled as described above.

According to the first embodiment, user data, such as, but not limited to, for example, a user ID, a password, etc., is communicated (exchanged) between the user data receiving section 60 and user data transmitting section 62 of the central office system 2 and the user data receiving section 64 and user data transmitting section 58 of the remote system 4.

User data channels 60 and 62 provides a low speed communication channel which is exchanged independently of the negotiation procedure in the negotiation data receiving section 52 and negotiation data transmitting section 54.

Negotiation data (e.g., control information) corresponding to the condition of the communication line (e.g., frequency characteristics, noise characteristics, presence or absence of a splitter, etc.) is exchanged between the negotiation data receiving section 52 and negotiation data transmitting section 54 of the central office system 2 and the negotiation data receiving section 56 and negotiation data transmitting section 50 of the remote system 4. It is noted that in the present embodiment, these communications (negotiation communications and user data communications) occur at substantially the same time (e.g., in parallel) by utilizing different frequency bands. However, the communications may also occur sequentially, in different time periods, without affecting the scope and/or spirit of the invention. Of course it is understood that the user data channel communication is not necessary for the correction function of the negotiation channel, and may thus be omitted without effecting the scope or spirit of the present invention.

Figure 3:
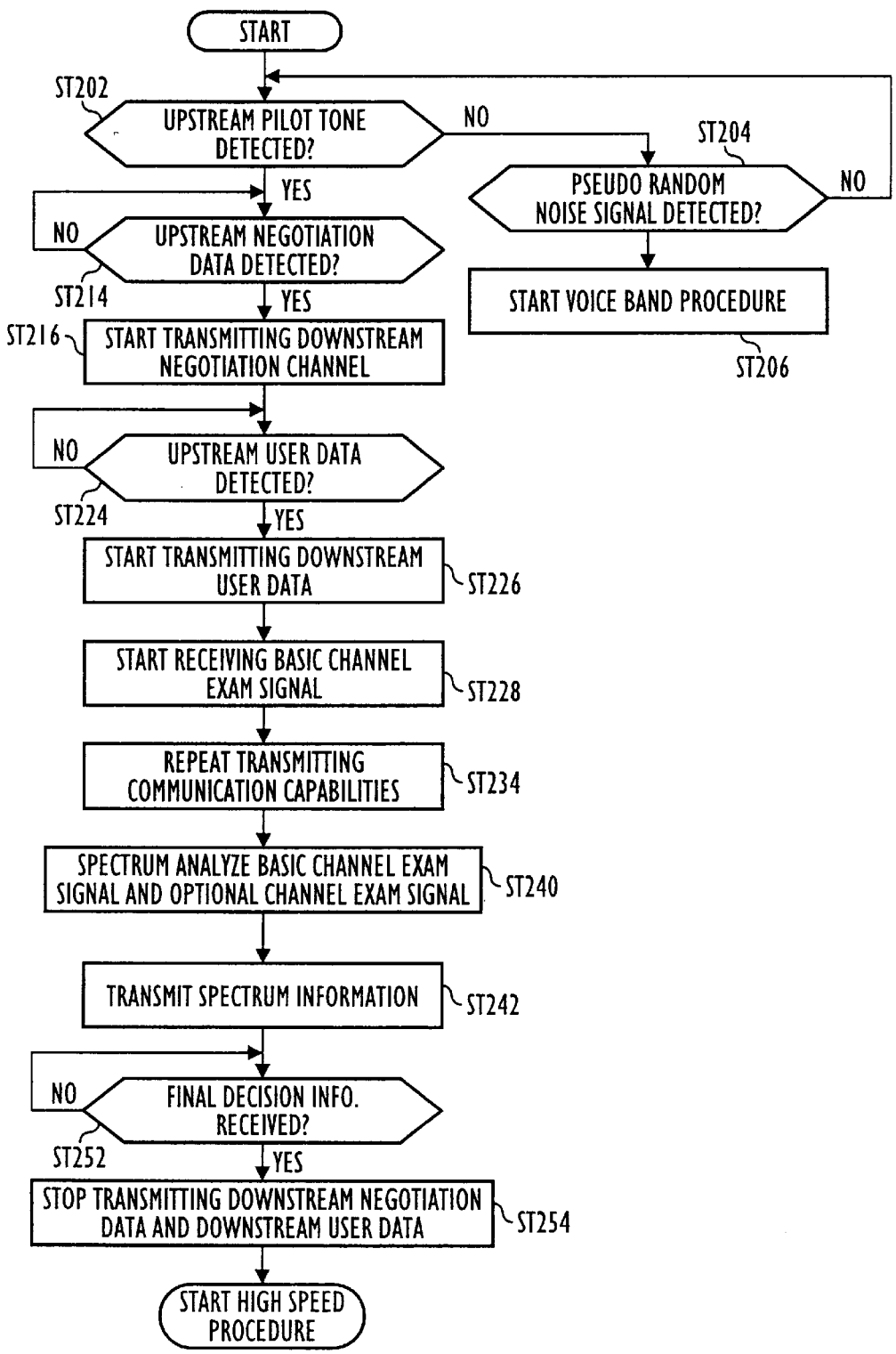
FIG. 3 illustrates a flow chart showing operations performed by a central system of the data communication system of the first embodiment.
Figure 4:
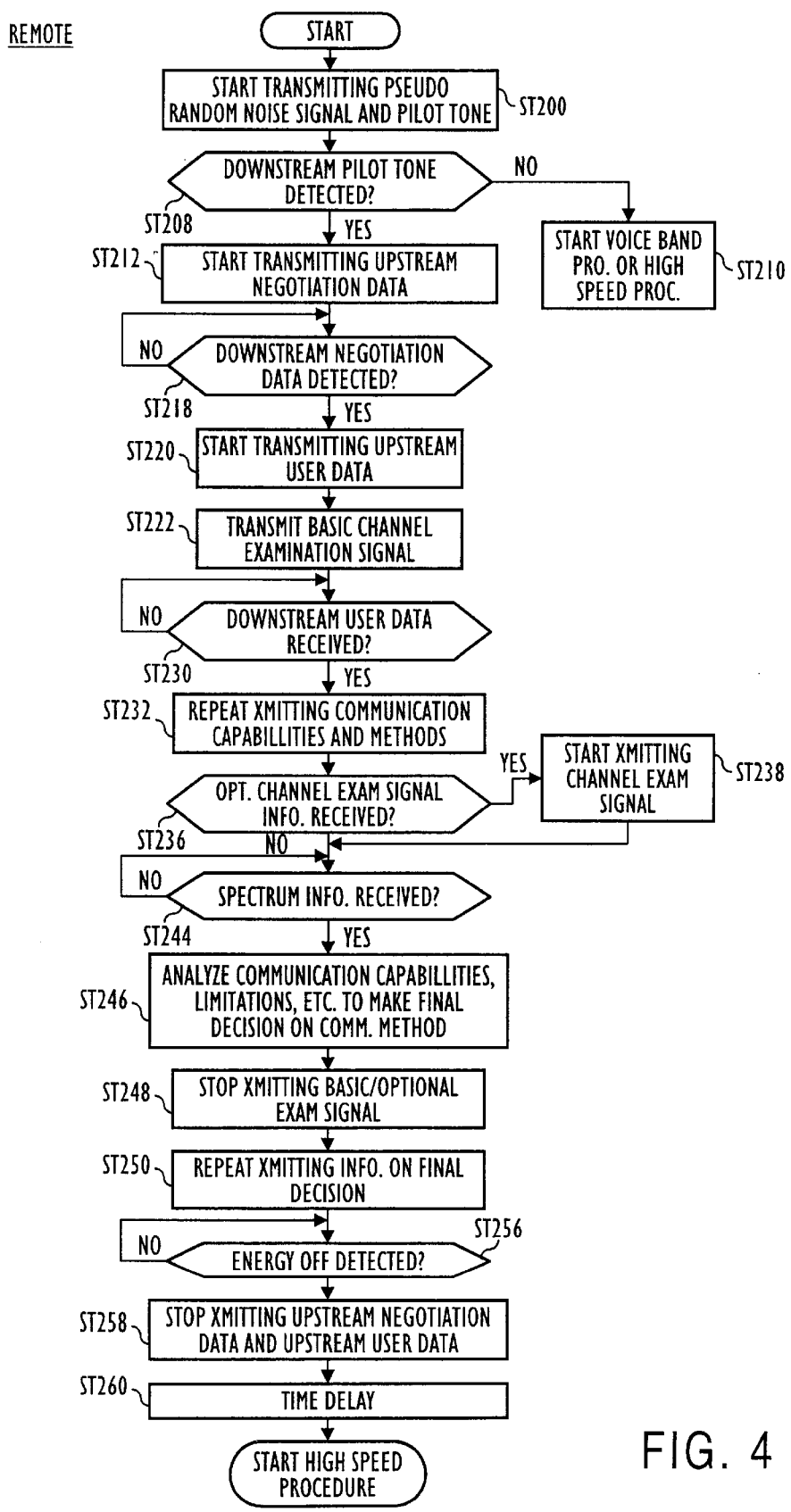
FIG. 4 illustrates a flow chart showing operations performed by a remote system of the data communication system of the first embodiment.
Figure 5:
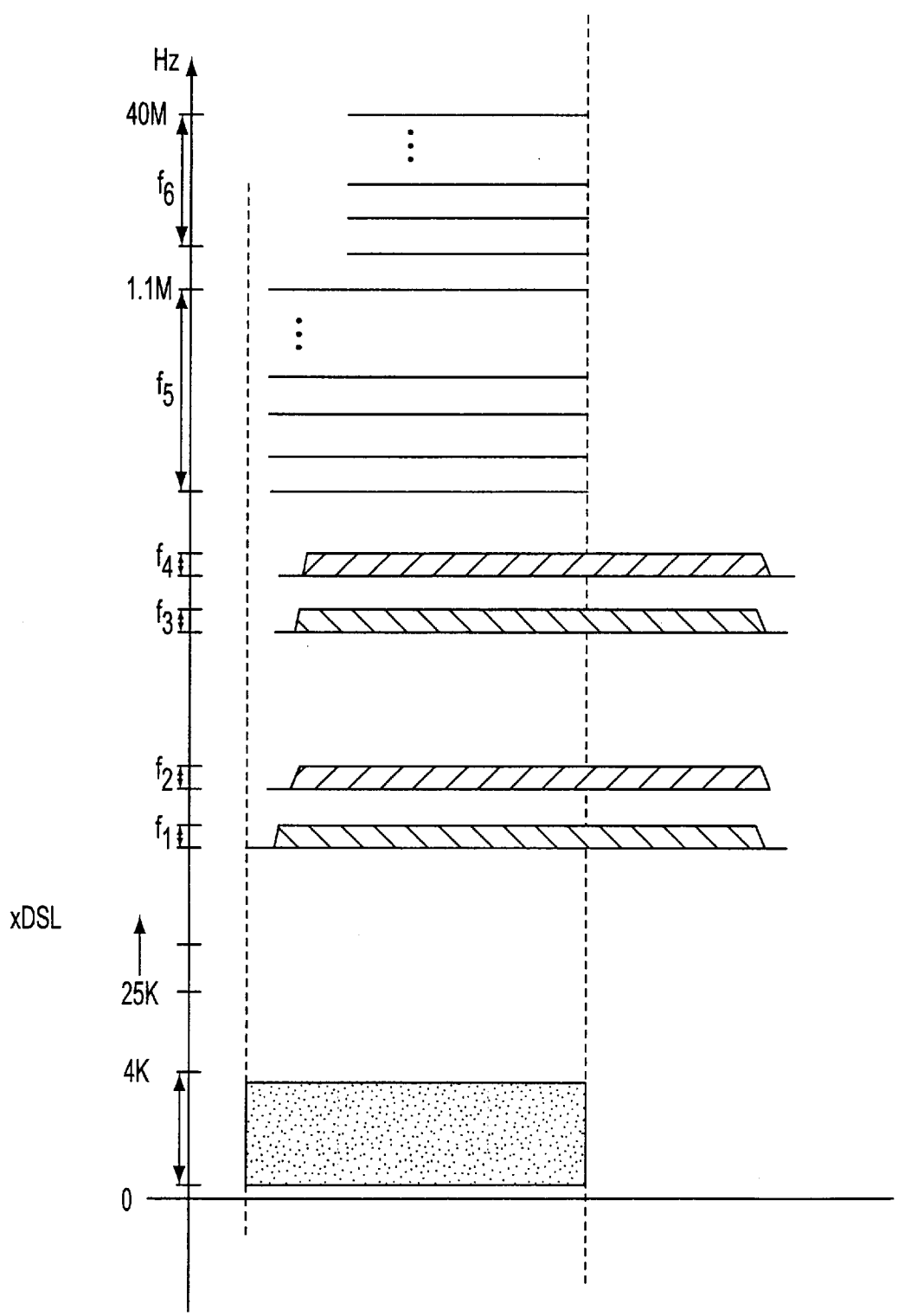
FIG. 5 illustrates a schematic of a distribution spectrum used in the data communication system of the first embodiment.

An example of a data communication according to the present invention will be described with reference to FIGS. 3–5. FIG. 3 illustrates a flowchart showing operations performed by the central office system 2. FIG. 4 illustrates a flowchart showing operations performed by the remote system 4. FIG. 5 illustrates a schematic block diagram showing the frequency spectrum distribution of signals used in the data communication system of the present invention.

In the disclosed embodiment, frequency division multiplexing (FDM) is utilized for various communication passes to exchange information between the central office system 2 and the remote system 4. However, it is understood that other techniques (such as, but not limited to, for example, CDMA, TDMA) may be used without departing from the spirit and/or scope of the present invention.

Communication path (band) f1 (see FIG. 5) comprises an upstream negotiation channel. Communication path f2 (FIG. 5) comprises a downstream negotiation channel. Control information concerning a high speed data communication is exchanged over the upstream and downstream negotiation channels f1 and f2. The remote system 4 negotiation data transmitting section 50 transmits in band f1 and central system 2 negotiation data receiving section 52 receives in band f1. The negotiating data transmitting section 54 of the central system 2 transmits downstream on channel f2, and negotiation data receiving section 56 of the remote system 4 receives data in band f2.

Communication path f3 (FIG. 5) comprises an upstream user channel for transmitting data, such as, but not limited to, for example, a user ID and/or password, to the remote system 4. Communication channel f4 (FIG. 5) comprises a downstream user channel for receiving data, such as, but not limited to, for example, a user ID and/or password, from the remote system 4. The remote system 4 user data transmitting section 58 transmits in band f3 and central system 2 user data receiving section 60 receives in band f3. The central system 2 user data transmitting section 62 transmits downstream on channel f4 and remote system 4 negotiation data receiving section 64 receives in band f4. It is noted that the exchange of information in the negotiation channel and the user channel occurs independently of each other.

In the disclosed embodiment, the frequency band of communication paths (negotiation channels) f1 and f2 is lower than the frequency band of communication paths (user channels) f3 and f4. Having the negotiation channel use the lower frequencies allows the system to exploit the observation that lower frequencies typically support the desirable lower error rates. However, it is understood that this arrangement (along with the actual frequency band of the various communication paths) can be varied without departing from the spirit and/or scope of the current invention.

A channel examination signal is transmitted in order to determine the communication capability of the communication link (connection) to be established. When the examination signal comprises a plurality of groups of signals, it is desirable to be able to independently transmit the groups of examination signals. In this embodiment, we define two groups of examination signals: (1) a basic channel examination signal, and (2) an optional channel examination signal.

Communication path f5 (FIG. 5) comprises a basic channel examination signal band, via which an basic channel examination signal, that determines the line characteristics of the communication channel, is transmitted. Similarly, communication path f6 (FIG. 6) comprises an optional channel examination signal band, for optionally transmitting an optional channel examination signal in a frequency band that is higher than that of the communication path f5. Tone signal generator 78 of remote system 4 generates the examination-signals that are transmitted in communication paths f5 and f6. Tone signal receiving section 80 of the central system 2 receives examination signals in communication paths f5 and f6. It is noted that the initiation of transmitting the basic channel examination signal and the optional channel examination signal may occur at different timings.

In the disclosed embodiment, the examination signal comprises a signal having a set of specific sinusoidal tones. The specific construction of the examination signal may be varied (altered) without departing from the scope and/or spirit of the present invention. For example, the construction of the examination signal may be (but is not limited to) a set of pure sinusoids having a plurality of frequencies, a plurality of signals, a broadband signal, noise signals (such as, for example, white noise over a specific band range) or a spread spectrum signal. Additionally, the examination signal may comprise a plurality of groups of signals that are transmitted in different frequency sub-bands. Still further, if the examination signal comprises a plurality of groups of signals, the phase relationships of the signals may differ.

The basic channel examination signal is transmitted with the initiation of a communications connection. The optional channel examination signal (e.g., an examination signal transmitted in the optional channel examination signal band f6) is only transmitted when it is desired to determine whether it is possible to perform a data communication in a frequency band that is higher than the frequency band of the basic channel examination signal band. However it is to be understood that the optional channel examination signal may begin transmission at the same time as the basic channel examination signal without departing from the spirit and/or scope of this invention.

The pseudo random noise signal generator section 74 of the remote system 4 (FIG. 2) transmits a notification signal in the voice band (approximately 0–4 kHz), as shown in FIG. 5. The notification signal provides the functionality of detecting the presence of a splitter and/or detecting capabilities notification function using the voice band. The capabilities notification function indicates at least one of the availability of a high speed data communication and the availability of a voice band communication.

Regarding the frequency content (spectrum) of the notification signal, the use of a specific frequency signal (or FM modulated signal) is undesired. For example, a CNG signal issued in accordance with a T.30 protocol (for establishing a facsimile connection), a CI signal issued in accordance with the V.8 protocol, etc., produce audible signals that interfere with voice band communication that may be in progress. As a result, in the disclosed embodiment, the notification signal preferably comprises a spread spectrum signal, such as, for example, a pseudo random noise signal. However, other types of signals may alternatively be employed. The use of a spread spectrum signal at suitable power levels prevents the reception of a signal that would interfere with voice communication.

In the disclosed embodiment, the notification signal includes an indication signal that indicates the data communication capabilities that are available in the voice band. The indication signal enables the other communication terminal (e.g., a central system 2 when the remote system 4 sends the indication signal) to recognize whether high speed data communication functions are available.

The notification signal can further be used to recognize whether the communication system utilizes a frequency splitting section (e.g., a splitter). The use of a splitter in a communication system will prevent the reception of voice band signals when a communication device is connected to the high frequency port. Thus, the absence of reception of the notification signal indicates that a splitter is installed in the communication system.

The following discussion is set forth with reference to the flow charts in FIGS. 3 and 4. Since there are decision branches in the flow charts, many possible combinations of process are possible. The typical (i.e., straight through the process) flow will be described in its entirety first, and thereafter, the flow through branches will be described. It is noted that the path through the procedure (flow chart) will depend on the installation arrangement (i.e., whether splitters are in the communication path, whether both sides implement the invention, whether external interference is degrading the quality of the communication channel 5, etc). Since the description of flow is a negotiation between associated communication devices, the actions of the individual associated devices will be described in a ping pong (zig-zag) manner between FIG. 3 and FIG. 4. FIG. 3 is processed by the test negotiation block 46 of the central system 2, while FIG. 4 is processed by the test negotiation block 48 of the remote system 4.

At step (abbreviated hereinafter as ST) 200, a pilot tone signal of a predetermined frequency is transmitted by the negotiation data transmitting section 50 of the remote system 4. Concurrently, a pseudo random noise signal is transmitted by the random noise generating section 74. In the central office system 2 at ST202, the negotiation data receiving section 52 examines the negotiation upstream band to determine whether the upstream pilot signal is being transmitted. When the negotiation upstream data pilot signal is detected, the central office system 2, begins transmitting the downstream negotiation pilot tone with 54.

ST208 is executed by the remote system 4 to determine whether the downstream pilot tone signal has been detected. If the downstream pilot tone has been detected by the remote system 4 at ST208, ST212 is executed, so that the negotiation data transmitting section 50 begins transmitting upstream negotiation data via upstream negotiation channel f1. In ST214, when the central office system 2 detects valid data, the negotiation data transmitting section 54 begins transmitting downstream negotiation data via the downstream negotiation channel f2. On the other hand, if the central office system 2 does not detect valid data, the operations for detecting data are repeated.

In ST218, the remote system 4 determines whether valid negotiation downstream data has been detected. When the remote system 4 detects valid data, the user data transmitting section 58 of the remote system 4 begins transmitting upstream user data via upstream user channel f3 (ST220). On the other hand, when the remote system 4 fails to detect valid data, ST218 is repeated until valid data is detected.

The remote system 4 also transmits a basic channel examination signal (ST222) in frequency band f5 (e.g., the basic channel examination signal channel). In response to this signal, an examination of the line characteristics will begin at the central office system 2.

The central office system 2 determines whether valid upstream user data is detected at the user data receiving section 60 (ST224). If the result of ST224 is negative, this step is repeatedly executed until such time as the result is affirmative. At that point, processing proceeds to ST226, so that the user data transmitting section 62 begins transmitting downstream user data via downstream user channel f4.

Then, ST228 is executed, in which the tone signal receiving section 80 of the central office system 2 starts receiving the basic channel examination signal emitted by the tone signal generating section 78 of the remote system 4.

In the remote system 4, the user data receiving section 64 determines whether it is receiving valid downstream user data (ST230). If the determination is negative, ST230 is repeatedly executed until such time as the result is affirmative. When the remote system 4 receives valid downstream user data (e.g., the determination is affirmative), all communication channels have been established.

At this point, ST232 is executed by the remote system 4 to repeatedly transmit the communication capabilities and communication methods information of the remote modem system 4 via the upstream negotiation path. At the same time, ST234 is executed, wherein the central office system 2 begins repeatedly transmitting its communication capabilities and desired communication conditions (including, but not limited to, for example, the indication that the optional channel examination signal information band f6 (ST236) can be utilized).

When the remote system 4 receives an indication from the central office that the use of optional channel examination signal is permitted (ST236 is affirmative), the tone generating section 78 of the remote system 4 starts transmitting the optional channel examination signal (ST238). On the other hand, if ST236 is negative, processing proceeds to ST244.

Meanwhile, the tone signal receiving section 80 of the central office system 2 performs a spectrum analysis of the signal to calculate spectrum information (ST240), which is then provided (ST242) to the remote system 4 via the downstream negotiation path f2.

The remote system 4 waits at ST244 until it determines that the spectrum information has been received. When the spectrum information is received, the remote system 4 analyzes it to determine, for example, the capabilities, channel limitations, etc. so as to make a final decision regarding the type of communication method (standard) to be employed (e.g., ADSL, CDSL, etc.) (ST246). The remote system 4 then stops transmitting the basic (and optional, if transmitted) examination signal (ST248). Then, the remote system 4 repeats the transmission of the information (using the upstream negotiation path f1), concerning (indicating) the final decision (ST250).

The central office system waits until it determines that the information regarding the final decision, from the remote system 4, has been received (ST252). When the central office system 2 detects the reception of the final decision, step ST254 is executed to stop transmitting downstream negotiation data and downstream user data.

On the remote system 4 side, the remote system 4 waits until it has detected a loss of energy (carrier) (ST256), at which time, the transmission of upstream negotiation data and upstream user data is terminated (ST258). Thereafter, the remote system 4 waits for the expiration of a predetermined time period (ST260) before starting an initialization procedures of the selected type of high speed communication system. After the negotiation and high speed initialization procedures are completed, an appropriate high speed communication channel is available between the central office system 2 and the remote system 4.

When the tone signal receiving section 80 of the central office system 2 can not detect the pilot tone signal at ST202, the pseudo random noise signal receiving section 76 of the central office system 2 determines whether a pseudo random noise signal in the approximate 0 Hz to 4 kHz voice band is present (detected) in ST204. When the pseudo random noise signal is detected, it is decided that a conventional voice band data communication may take place (ST206) and/or that the equipment could support high speed communication but the channel could not support high speed communication. That is, the present invention determines that a fallback communication connection in the conventional voice band, such as, but not limited to, for example, a V.8, V.8bis, V.34 protocol, may take place. When the pseudo random noise signal is not detected, ST202 is re-executed to once again attempt to detect the pilot tone signal.

Thus, by issuing a notification signal (e.g., the pseudo random noise signal) within the voice band, and by determining whether the notification signal can be received, it is determined whether a high speed data communication function is available.

If however, it is not possible to perform a high speed data communication, the present invention provides for the fall back to a voice band communication procedure. For example, when a high speed data communication is not performed, a data communication using the V.34 protocol may be used.

If the downstream pilot tone signal is not detected in ST208, ST210 is performed by the remote system 4 to initiate either a voice band procedure (e.g., V.8, V.8bis) or an alternative high speed procedure.

In summary, the negotiation blocks 46 and 48 have performed an analysis of the communication channel and associated equipment (at both the central office and remote locations) and then selected the appropriate communication standard.

Figure 6:
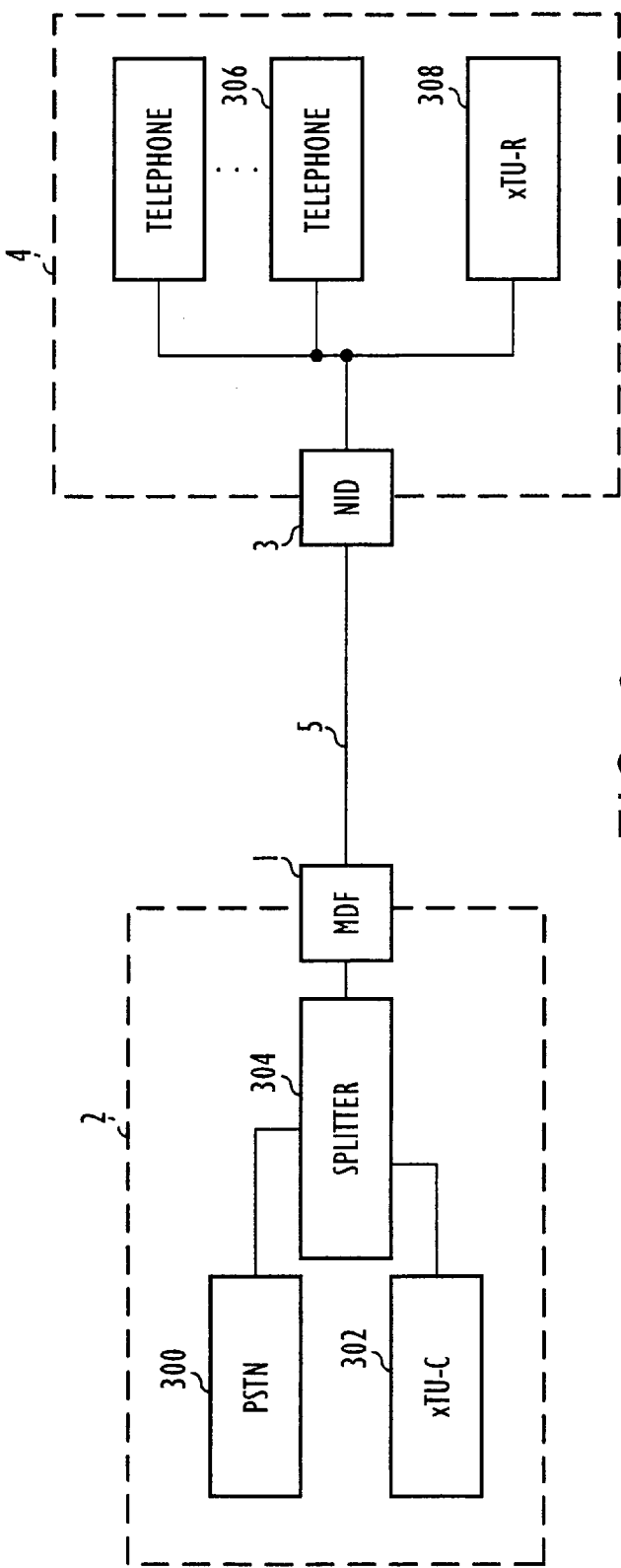
FIG. 6 illustrates a schematic of the data communication system of the first embodiment.

FIG. 6 depicts a conceptual installation diagram of the first embodiment of the instant invention. Central office splitter 304 compromises LPF 34 and HPF 38, and provides signals to various blocks in block 46 and the modem 68, 70 represented in the drawing as xTU-C 302. The PSTN switch 300 is connected to channel 6. Telephones 306 are nominally connected to channel 33. However, it is understood that the telephones 306 can be connected to channel 32 without diverting from the scope and/or spirit of the present invention.

Various modifications may be made to the disclosed embodiment. FIGS. 7–12 illustrate schematic block diagrams of additional, non-limiting embodiments of the instant invention. Like elements contain the same reference numbers as described in the first embodiment.

Figure 7:
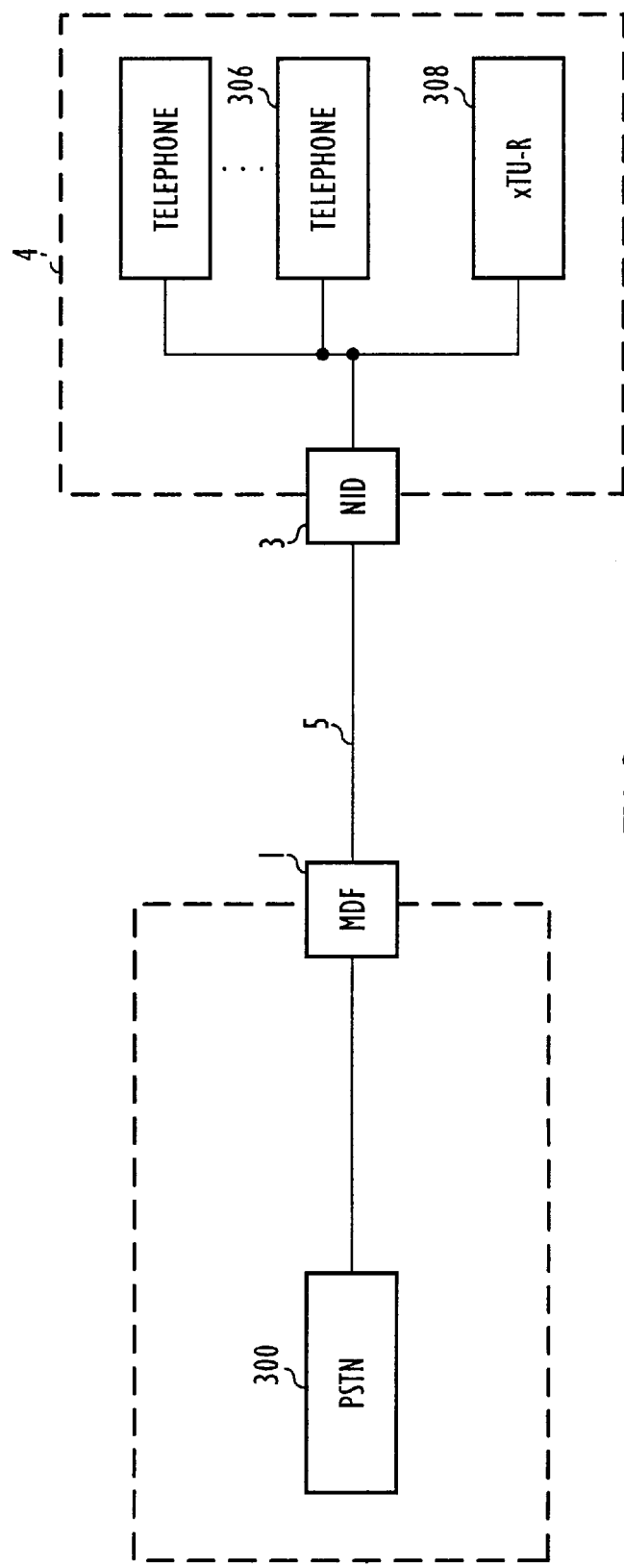
FIG. 7 illustrates a schematic of the data communication system using a modem device according to a second embodiment of the present invention.
Figure 8:
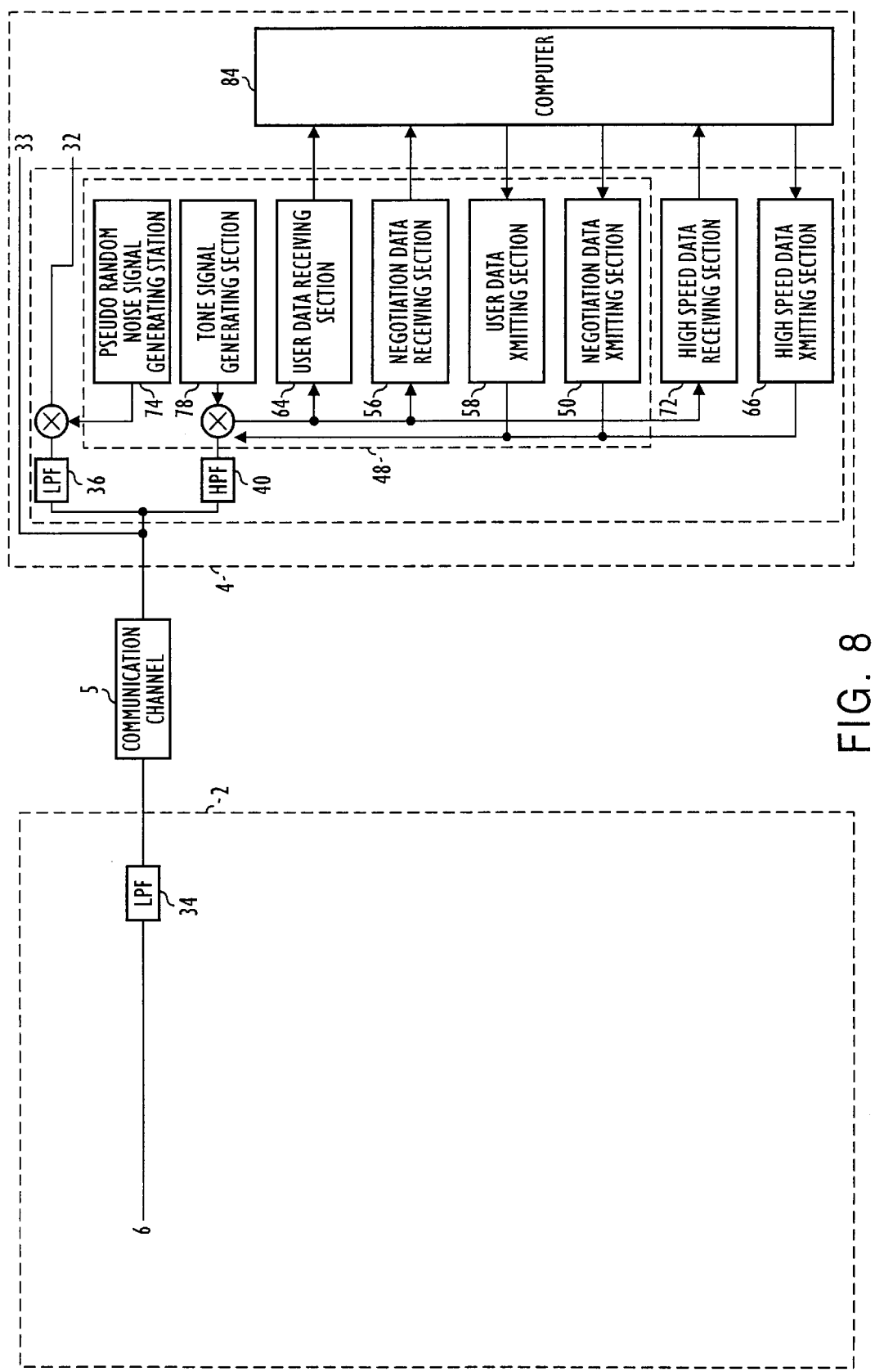
FIG. 8 illustrates a detailed block diagram of the data communication system shown in FIG. 7.

FIGS. 7 and 8 depict a second embodiment of the present invention, in which the invention is only implemented at the remote end 4, and the central office 2 is not high speed compatible. When the remote end 4 attempts to connect to the central office 2, ST208 (FIG. 4) fails to detect the downstream pilot tone. As a result, the voice band procedures in ST210 are initiated. Channel 6 represents the voice band signal that is provided to PSTN switch 300, as illustrated in FIG. 7.

A variation of this embodiment (not illustrated) is where the central office 2 implements the instant invention while the remote end 4 does not employ high speed data communications. In such a situation, the central office 2 would fail to detect the upstream pilot tone in ST202, but, if it detected the pseudo random noise signal it would initiate voice band procedures in ST206. Similarly, if the central system 2 fails to detect the upstream pilot tone in ST202 and also fails to detect the pseudo random noise signal at ST204 after a suitable time out, voice band procedures begin.

Figure 9:
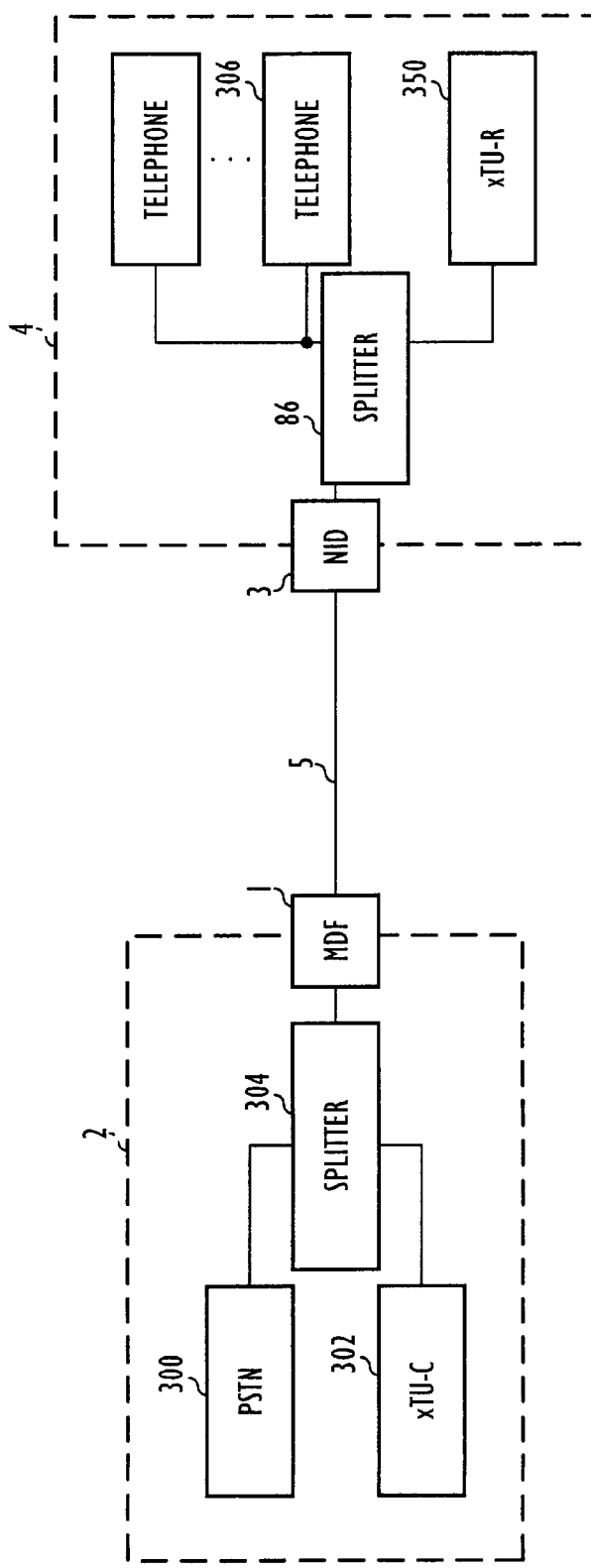
FIG. 9 illustrates a schematic of the data communication system according to a third embodiment of the present invention.
Figure 10:
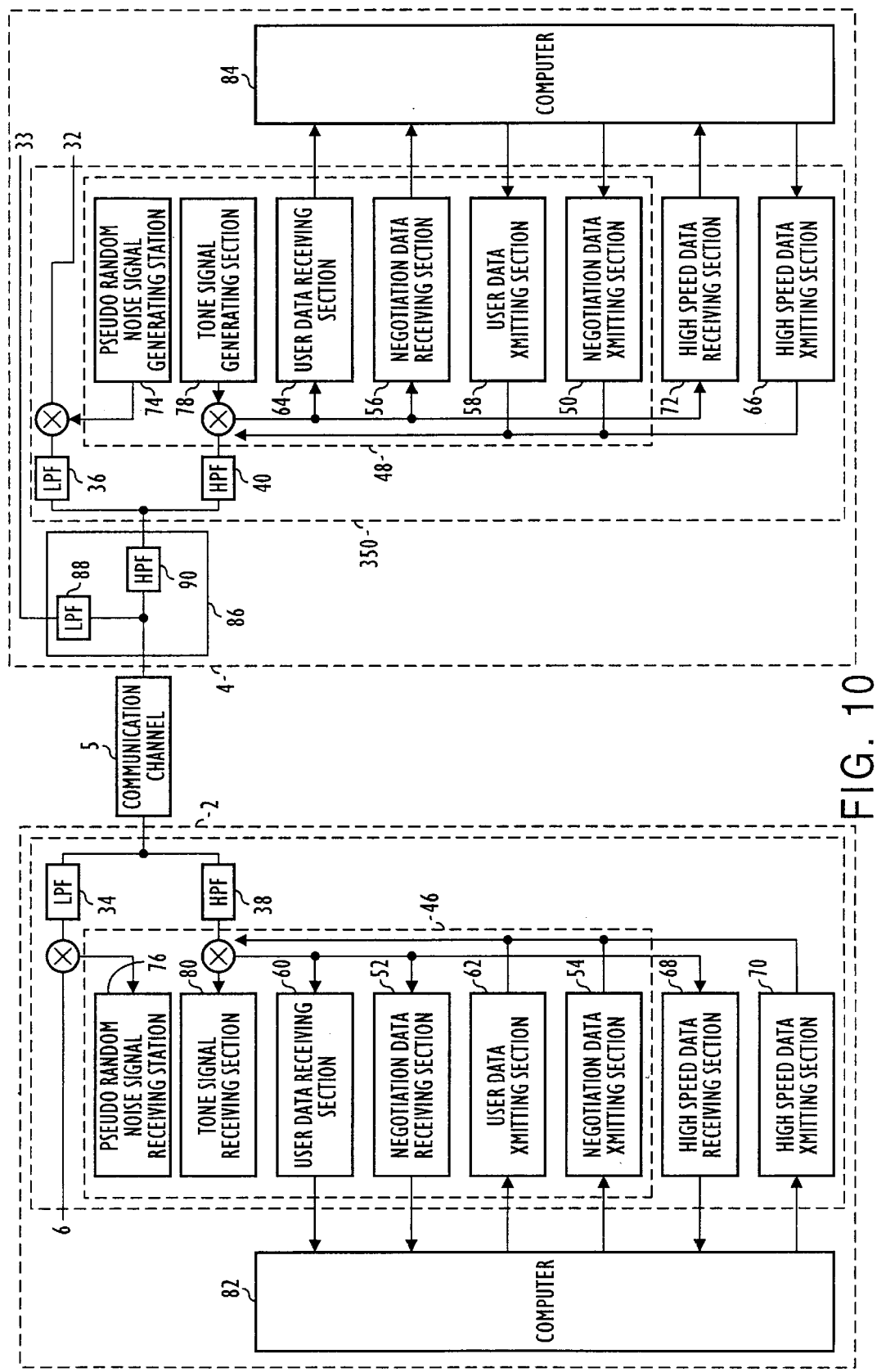
FIG. 10 illustrates a detailed block diagram of the data communication system shown in FIG. 9.

FIGS. 9 and 10 illustrate a third embodiment of the instant invention. This embodiment differs from the first embodiment in that a remote splitter 86 is provided in the remote system 4 to separate the remote x-type transmission unit (xTU-R) 350 from the telephone network 306. In this configuration, the performance of the xTU-C (302) and xTU-R (350) are improved, because the use of splitter 86 significantly reduces interference between the high speed and voice band spectrums. As shown in FIG. 10, the splitter 86 comprises a low pass filter 88 and a high pass filter 90. In this embodiment, the pseudo random noise signal does not pass through the high pass filter 90. Thus, the random noise receiving section 76 of the central office system 2 does not receive the pseudo random noise signal produced by the remote system 4 which indicates that a splitter is present. This information is exchanged during the negotiation phase. As a result, the detection of the splitter filter is automatically detected and indicated.

In this embodiment, telephones 306 (FIG. 9) are connected to channel 33 (FIG. 10). The configuration of central office system 2 of FIG. 9 is comparable to the configuration of central office 2 in FIG. 6.

Figure 11:
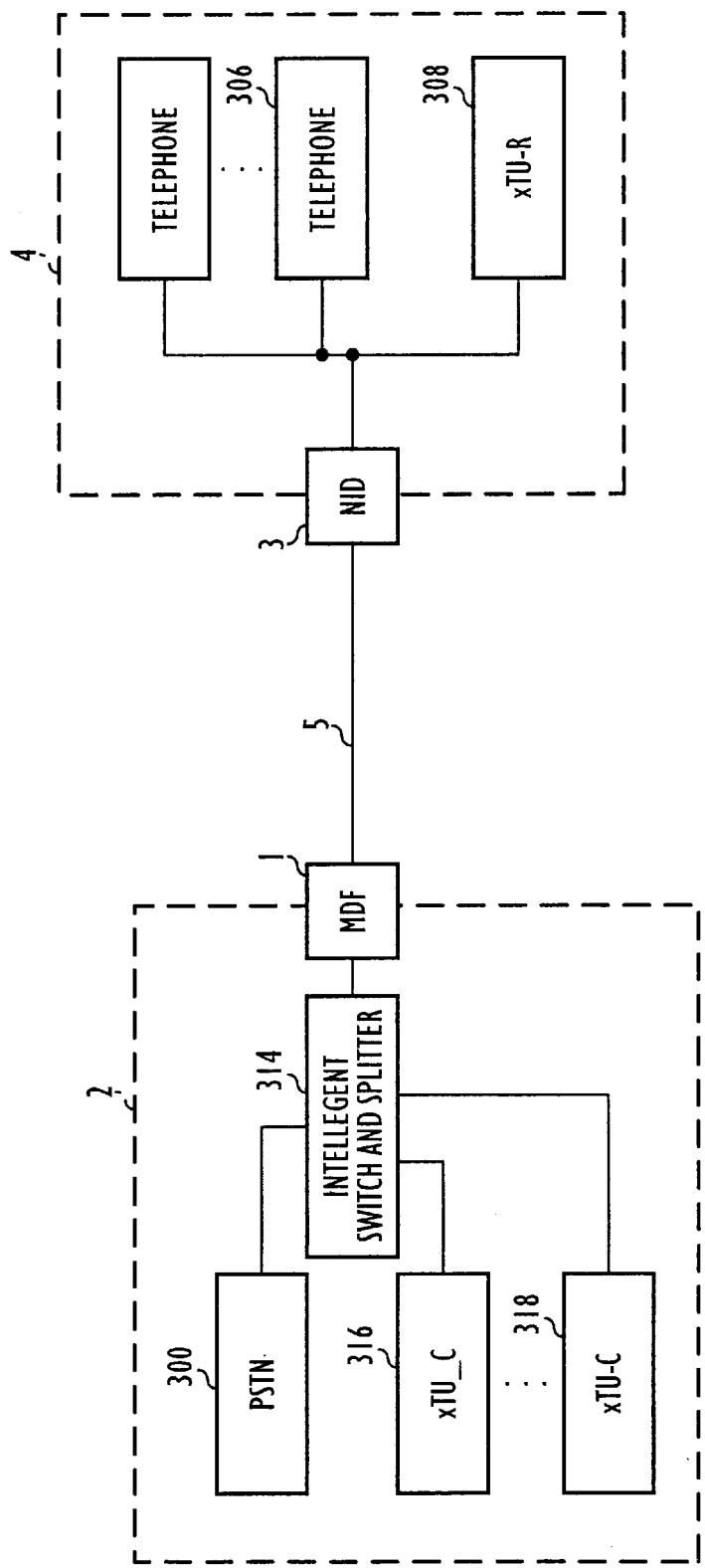
FIG. 11 illustrates a schematic of the data communication system according to a fourth embodiment of the present invention.

A fourth embodiment of the present invention is illustrated in FIG. 11. In this embodiment, intelligent switch 314 compromises the functionality performed by test negotiation block 46, and selects the appropriate xTU-C (e.g., 316 or 318) to establish the selected communication standard (such as, for example, ADSL, VDSL, ISDN, V.34).

Figure 12:
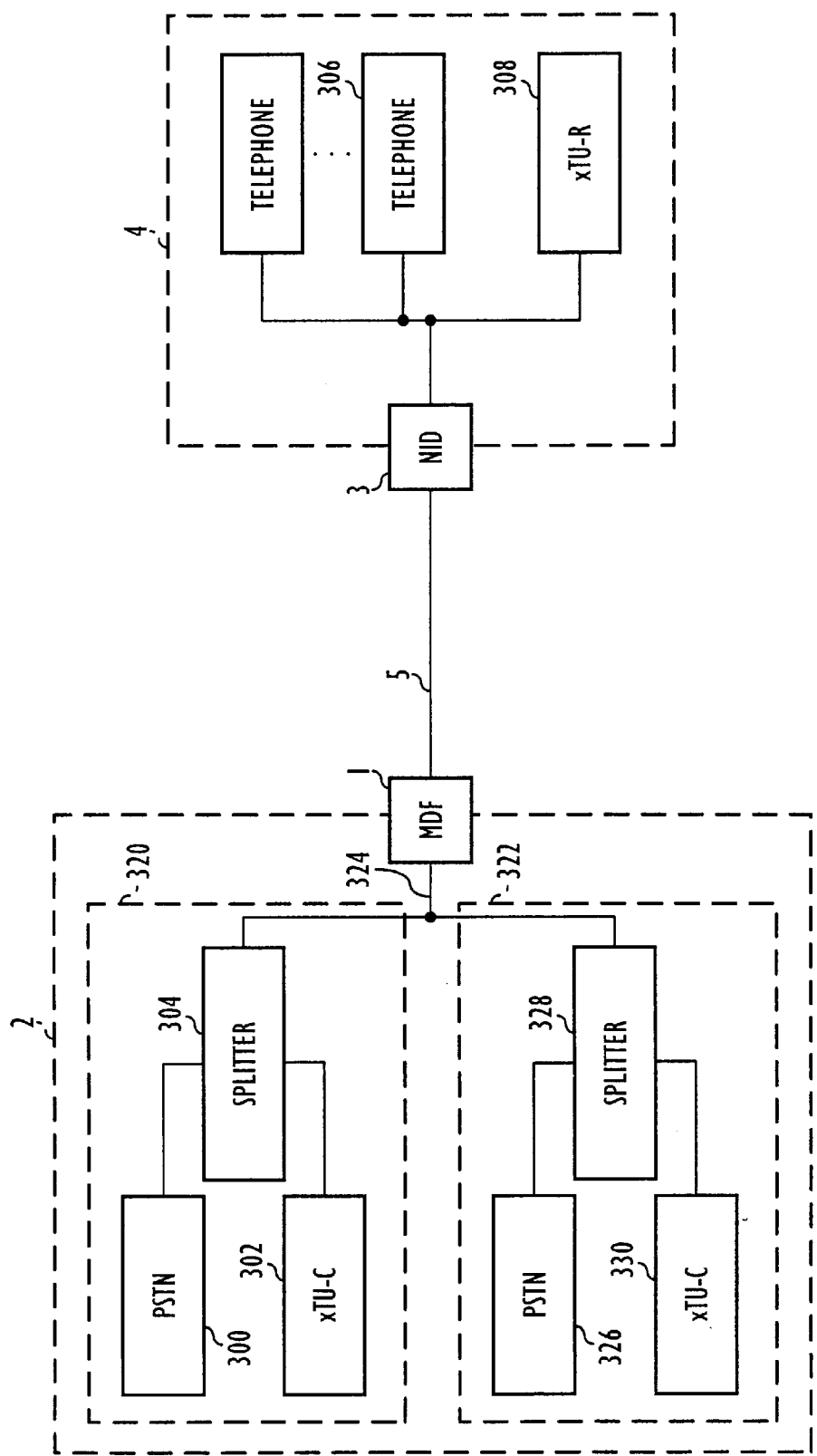
FIG. 12 illustrates a schematic of the data communication system according to a fifth embodiment of the present invention.

A fifth embodiment of the present invention is shown in FIG. 12. In this embodiment, the central office system 2 is divided into plural portions (e.g., a first portion 320 and a second portion 322), so that communication operations can be performed by plural service providers. It is noted that the construction of the various portions is essentially the same as that shown in FIG. 9. First portion 320 and second portion 322 can be configured in a manner similar to the manner described in any of the previous embodiments. As described above in previous environments, splitters 304 and 328 are included to separate the voice band signals from the high speed communication.

According to this embodiment, the public switched telephone network (PSTN) switches 300 and 326, and xTU-C units 302 and 330 are configured by service providers that provide specific services. When a remote system initiates a request for service, only the system capable of providing the desired service (as determined by the upstream negotiation data response to a downstream negotiation transmission) is connected to the remote system.

The present invention provides a quick and efficient determination of the optimum communication standard to employ from among a plurality of communication standards. Specifically, the present invention includes, among other features, the ability to effectively select a single communication standard from among a plurality of communication standards; determine, disclose, and utilize channel characteristics; non-obtrusively determine the presence or absence of a splitter in the communication path; and, allow user data to be exchange between the central office and the remote system before the high speed communication path is available.

It is noted that in the current invention, data communication may begin concurrently with the negotiation procedure. That is, a user communication (e.g., data communication) may be executed concurrently with a line examination and negotiation operation. However, the transmission of the user communication may begin after the negotiation operation has been performed, without departing from the spirit and/or scope of the present invention.

Although the invention has been described with reference to particular means, materials, and embodiments, it is to be understood that the invention is not limited to the particulars disclosed herein and extends to all equivalents within the scope of the claims. For example, computer 82 or 84 can be replaced by other devices (such as, but not limited, to network equipment) that generate data signals to be transmitted via the communication channel 5.

I claim:

1. A method for selecting a communication standard from among a plurality of communication standards, comprising:
auditing a condition of a communication channel to be established between a first communication device and a second communication device by determining whether a splitter is attached to the audited communication channel; and
selecting the communication standard used to exchange data between the first communication device and the second communication device from among a plurality of communication standards based upon the audited condition of the communication channel and a capability of each of the plurality of communication standards.

2. A communications device for testing a high speed communication channel used to exchange data, comprising:
a first communication device that at least one of transmits and receives negotiation information relating to communication standards over a high speed communication channel, said communication standards identifying different xDSL formats; and
a second communication device that at least one of transmits and receives examination information over the high speed communication channel to determine line characteristics of the high speed communication channel, said negotiation information and said examination information being exchanged between said first communication device and said second communication device prior to establishing said high speed communication channel between said first communication device and said second communication device, wherein said examination information comprises a plurality of signals in different frequency bands.

3. A communications device for exchanging data, comprising:
a first communication device that at least one of transmits and receives negotiation information relating to communication standards over a high speed communication channel, said communication standards identifying different xDSL formats; and
a second communication device that at least one of transmits and receives examination information over the high speed communication channel to determine line characteristics of the high speed communication channel, said negotiation information and said examination information being exchanged between said first communication device and said second communication device prior to establishing said high speed communication channel between said first communication device and said second communication device, wherein said communication device exchanges said examination information over the communication channel in a first predetermined frequency band.

4. A communications device for exchanging data, comprising:
   a first communication device that at least one of transmits and receives negotiation information relating to communication standards over a communication channel; and
   a second communication device that at least one of transmits and receives examination information over the communication channel to determine line characteristics of the communication channel, wherein said communication device exchanges said examination information over the communication channel in a first predetermined frequency band, wherein said communication device exchanges an optional examination signal in a second predetermined frequency band.

5. A communications device for exchanging data, comprising:
   a first communication device that exchanges negotiation information related to a predetermined data communication; and
   a second communication device that exchanges a fallback notification signal over a second predetermined data communication band, said fallback notification signal being used to indicate an availability of the second predetermined communication band for exchanging digital user data, wherein a communication channel is established after said negotiation information and said fallback notification signal have been exchanged.

6. The communication device of claim 5, wherein the second predetermined data communication band comprises a voice band.

7. The communications device of claim 5, wherein said negotiation information and said fallback notification signal are exchanged in a substantially concurrent time period.

8. The communications device of claim 5, wherein said negotiation information and said fallback notification signal are exchanged in different time periods.

9. The communication device of claim 6, further comprising a voice band communication device that is utilized to exchange digital data when the first communication band is unusable.

10. The communication device of claim 6, wherein said fallback negotiation signal does not interfere with any communication in the voice band.

11. The communications device of claim 10, wherein said fallback notification signal comprises a spread spectrum signal.

12. A method for exchanging data between an initiation location and a responding location, comprising:
   determining whether a predetermined signal is detected by the responding location;
   initiating fallback procedures if the predetermined signal is not detected by the responding location;
   exchanging negotiation information between the initiating location and the responding location to establish capabilities of the initiating location and the responding location;
   receiving channel information by one of the initiating location and the responding location; and
   selecting an appropriate communication standard, utilizing at least one of the exchanged negotiation information and received channel information, to establish a communication link.

13. The method of claim 12, further comprising:
   analyzing the received channel information; and
   using the analyzed information in conjunction with the at least one of the exchanged negotiation information and received channel information to select the appropriate communication standard.

14. The method of claim 12, wherein initiating of fallback procedures comprises using a voice band procedure.

15. The method of claim 12, further comprises exchanging user data between the initiating location and the responding location.

16. A communications device, comprising:
   means for determining line characteristics of a communication channel prior to initiating a high speed xDSL data communication;
   means for initiating said high speed xDSL data communication over the communication channel, based upon a comparison of the line characteristics of the communication channel with pre-existing characteristic criteria; and
   means for performing one of a low speed non-xDSL and ISDN data communication over a voice band in the communication channel when said determining means determines that the line characteristics of the communication channel do not support said high speed xDSL data communication.

* * * * *

UNITED STATES PATENT AND TRADEMARK OFFICE
CERTIFICATE OF CORRECTION

PATENT NO. : 6,735,245 B1
DATED : May 11, 2004
INVENTOR(S) : S. Palm

It is certified that error appears in the above-identified patent and that said Letters Patent is hereby corrected as shown below:

<u>Title page,</u>
Item [56], References Cited, U.S. PATENT DOCUMENTS, "5,898,761" should be -- 5,989,761 --.

Signed and Sealed this

Twenty-second Day of February, 2005

JON W. DUDAS
*Director of the United States Patent and Trademark Office*

UNITED STATES PATENT AND TRADEMARK OFFICE
CERTIFICATE OF CORRECTION

PATENT NO. : 6,735,245 B1
DATED : May 11, 2004
INVENTOR(S) : S. Palm

It is certified that error appears in the above-identified patent and that said Letters Patent is hereby corrected as shown below:

<u>Title page,</u>
Item [56], References Cited, U.S. PATENT DOCUMENTS, "5,898,761" (as deleted by Certificate of Correction issued February 22, 2005) should be reinstated.

Signed and Sealed this

Nineteenth Day of July, 2005

JON W. DUDAS
*Director of the United States Patent and Trademark Office*